(12) United States Patent
Ng

(10) Patent No.: US 7,062,673 B2
(45) Date of Patent: Jun. 13, 2006

(54) SYSTEM AND METHOD FOR SPARING IN RAID-1 SYSTEM

(75) Inventor: Spencer W. Ng, San Jose, CA (US)

(73) Assignee: Hitachi Global Technologies (NL)

( * ) Notice: Subject to any disclaimer, the term of this patent is extended or adjusted under 35 U.S.C. 154(b) by 542 days.

(21) Appl. No.: 10/441,176

(22) Filed: May 19, 2003

(65) Prior Publication Data

US 2004/0236986 A1 Nov. 25, 2004

(51) Int. Cl.
*G06F 11/00* (2006.01)
(52) U.S. Cl. ............................................. 714/6; 714/7
(58) Field of Classification Search ............... 714/6, 714/7; 711/114
See application file for complete search history.

(56) References Cited

U.S. PATENT DOCUMENTS

| | | | |
|---|---|---|---|
| 5,258,984 A | 11/1993 | Menon et al. ............. 371/10.1 |
| 5,485,571 A | 1/1996 | Menon ................... 395/182.05 |
| 5,657,439 A * | 8/1997 | Jones et al. ..................... 714/7 |
| 5,666,512 A * | 9/1997 | Nelson et al. ............... 711/114 |
| 5,678,061 A * | 10/1997 | Mourad ....................... 710/21 |
| 6,154,853 A * | 11/2000 | Kedem ........................... 714/6 |
| 6,557,123 B1 | 4/2003 | Wiencko, Jr. et al. ...... 714/701 |
| 6,745,284 B1 * | 6/2004 | Lee et al. ................... 711/114 |
| 6,915,448 B1 * | 7/2005 | Murphy et al. ................ 714/6 |
| 6,934,804 B1 * | 8/2005 | Hashemi ..................... 711/114 |

* cited by examiner

*Primary Examiner*—Robert Beausoliel, Jr.
*Assistant Examiner*—Amine Riad
(74) *Attorney, Agent, or Firm*—John L. Rogitz

(57) ABSTRACT

A RAID-1 system achieves sparing by allocating $1/(2N-1)$ of each storage device as a spare region, in a mirrored RAID-1 system having N pair of mated devices. The remaining portion of each device is partitioned into $(2N-2)$ data partitions. If a device fails, the contents of its mate are copied into the spare regions of the other devices. This preserves fault tolerance even if a second device subsequently fails.

17 Claims, 3 Drawing Sheets

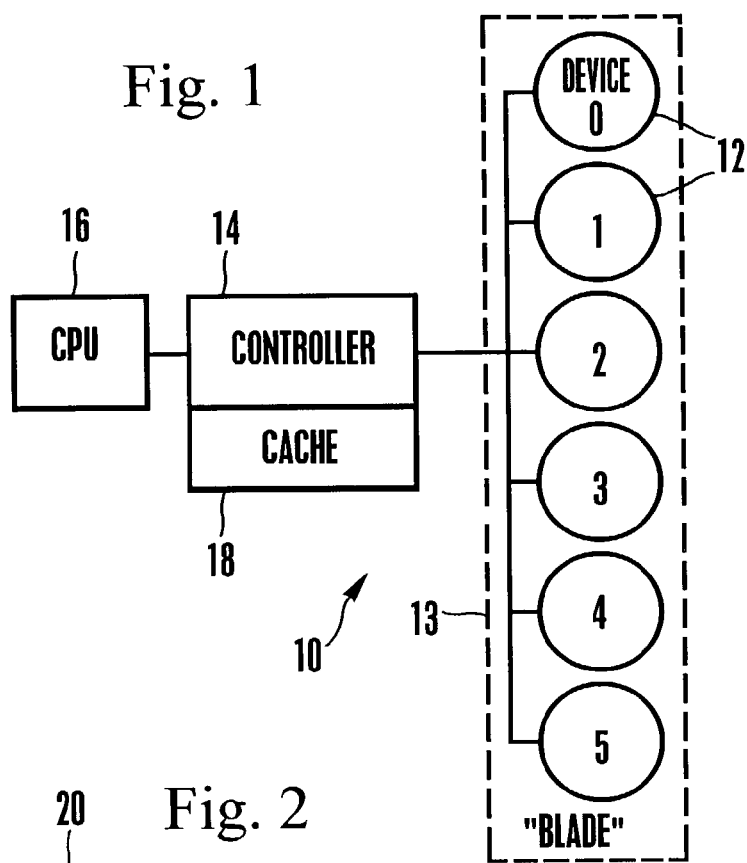
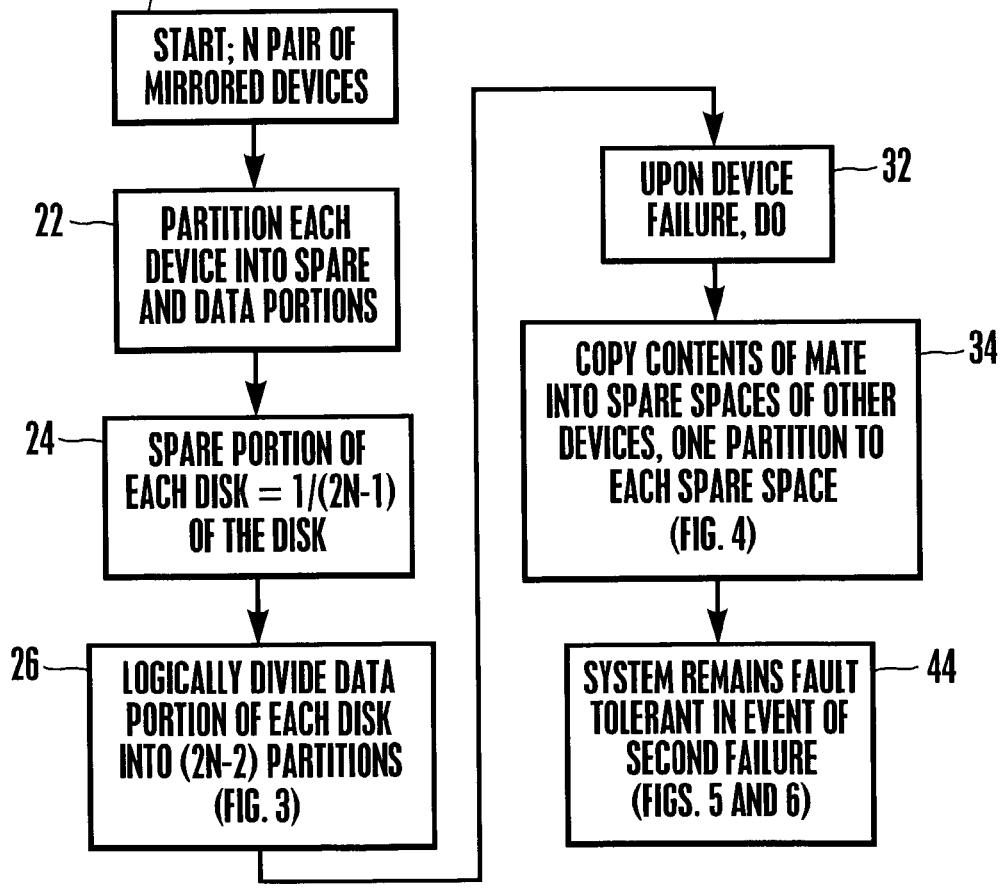

First Failure

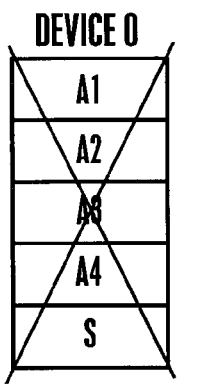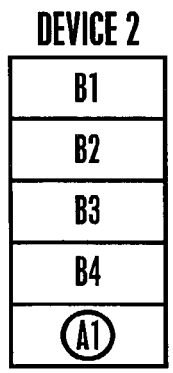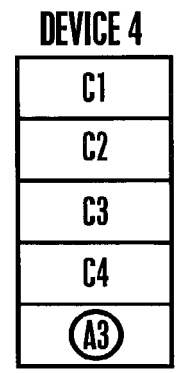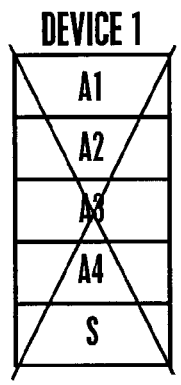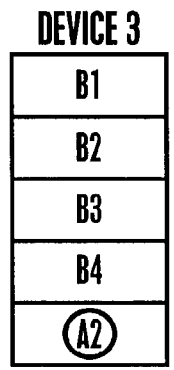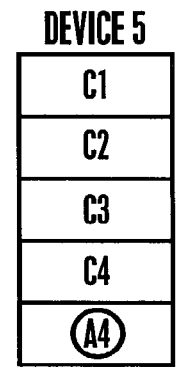
Fig. 5 Second (Mate) Failure
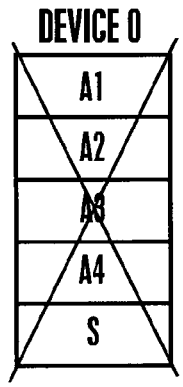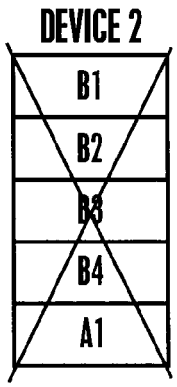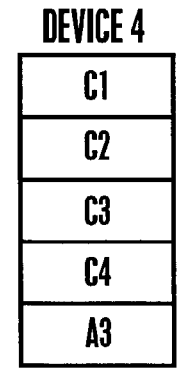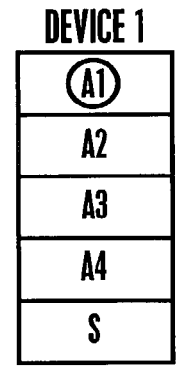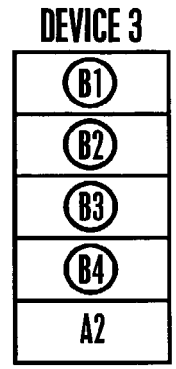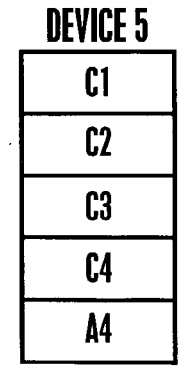
Fig. 6 Second (Not Mate) Failure

SYSTEM AND METHOD FOR SPARING IN RAID-1 SYSTEM

BACKGROUND OF THE INVENTION

1. Field of the Invention

The present invention relates generally to maintaining spare storage space in a mirrored storage system for use in the event of storage device failure.

2. Description of the Related Art

Disk array systems such as redundant arrays of independent disks (RAID) are used to reliably store data by adding redundancy to the data spread over plural disk drives operating in concert. The present invention is directed to mirrored RAID systems, also referred to as RAID-1 systems. In RAID-1 systems, which are designed to efficiently execute small writes to the storage medium, two identical copies of data are maintained on a disk array. Specifically, the storage devices in RAID-1 systems are arranged in pairs, with each disk of a pair holding data that is identical to the data held by its mate. In contrast, in RAID-5 systems, data and checksum (parity) information is distributed across all drives, such that if a device fails, its data can be reconstituted from the parity information and remaining information on the other devices.

As understood herein, it is desirable to provide spare space in a RAID array, so that if a device fails, its contents may be reconstituted (in the case of RAID-5) or copied over from its mate (in the case of RAID-1) to the spare space, to preserve redundancy. Because of the different configurations of RAID-1 and RAID-5 systems, however, sparing schemes designed for RAID-5, such as those disclosed in, e.g., U.S. Pat. Nos. 5,258,984, 5,657,439, and 5,485,571, are not applicable to RAID-1 systems. Nonetheless, for better performance and even higher reliability, RAID-1 systems remain preferred for certain applications.

Currently, two methods are provided for sparing in RAID-1 systems. The first is simply to provide an extra $(2N+1)^{th}$ device in the system, so that if a device fails, the content of its mate can be copied onto the spare. Unfortunately, in some implementations, such as arranging RAID devices on a large, field-removable card known as a "blade", space is at a premium. There may simply not be enough room for the extra spare device.

The second method currently provided for sparing in RAID-1 systems is to relinquish an entire pair of mated devices for use as spares. This, of course, reduces the capacity of the system by an entire pair of devices.

Having recognized the above problems, the solutions below are provided.

SUMMARY OF THE INVENTION

A system includes computer usable instructions for causing a digital processing apparatus to undertake logic in a mirrored storage system that has N pair of storage devices. The logic includes allocating $1/(2N-1)$ of each device as a spare region, in which substantially no data is stored except when a device fails. The logic also includes partitioning the remaining non-spare region of each disk into $(2N-2)$ data partitions. In the event of a failed device, data in the data partitions of its mate is copied into respective spare regions of the other $(2N-1)$ remaining non-failed devices (i.e., excluding the mate). The preferred non-limiting storage devices may be arranged on a blade, but the present invention is not limited to such an arrangement.

With this invention, if the mate fails after the first device fails, data that is stored on the mate nonetheless remains available on non-failed devices. Likewise, if a second device that is not a mate to the first device fails after the first device fails, some data stored on the second device remains available on the mate of the second device, and remaining data stored on the second device remains available on the mate of the first device. The storage devices may be hard disk drives or head-disk assemblies (HDAs).

In another aspect, a data storage system includes plural data storage devices in a RAID-1 configuration, with a spare region being allocated on each device. Also, data storage regions are allocated on each device.

In still another aspect, a method for operating a RAID-1 data storage system having N pair of data storage devices includes allocating $1/(2N-1)$ of each device as a spare region, and partitioning the remaining non-spare region into $(2N-2)$ data partitions. In the event of a failure of a first device, the method includes copying data from its mate to devices that are not paired with the first device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of the present system;

FIG. 2 is a flow chart of the present logic;

FIGS. 5 and 6 are schematic diagrams of the storage devices after a second mate and non-mate device failure, respectively.

DETAILED DESCRIPTION OF THE PREFERRED EMBODIMENTS

Figure 3:
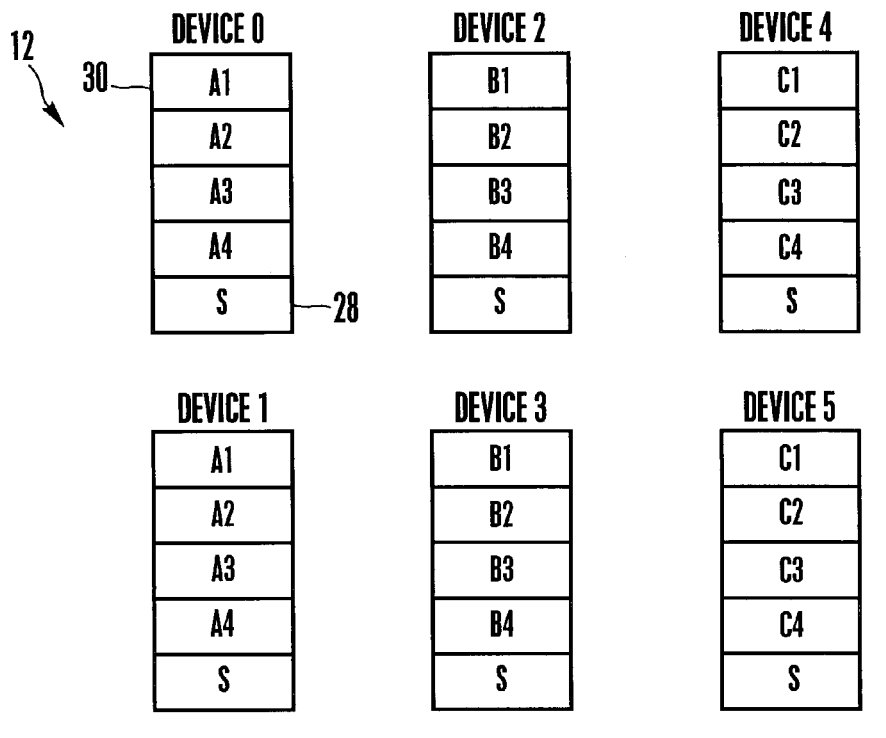
FIG. 3 is a schematic diagram of the storage devices after partitioning into data spaces and spare spaces.

Referring initially to FIG. 1, a system is shown, generally designated 10, for ensuring data redundancy. The system 10 is a mirrored system in which there are "N" pair of data storage devices 12, such as disk drives, with the devices in a pair holding identical copies of the same data. The system 10 in some implementations is referred to as a RAID-1 system. In a preferred implementation the devices 12 are arranged on a large field-removable card 13 colloquially called a "blade". The illustrative non-limiting embodiment of FIG. 1 shows six devices 12, numbered zero through five.

As shown in FIG. 1, the system 10 may include a digital processing apparatus, such as a controller 14, which communicates with the storage devices 12. The controller 14 can communicate with a computer or CPU 16. In one intended embodiment, either one or both of the controller 14 and computer 16 may be implemented by personal computers, servers, laptop computers, palmtop computers, or any other appropriate digital processing device. In yet another embodiment, the controller 14 is included on the blade such that the blade forms a complete storage subsystem. In any case, the controller 14 receives read and write requests from the computer 16 for data stored on the devices 12. If desired, the controller 14 may also communicate with a storage cache 18.

The controller 14 executes the logic shown in FIG. 2 by using computer instructions that may be contained on a data storage device with a computer readable medium, such as a computer diskette. Or, the instructions may be stored on a conventional hard disk drive including one or more of the devices 12, electronic read-only memory, optical storage device, or other appropriate data storage device.

Now referring to FIG. 2, the logic starts at block 20 with N pair of mirrored data storage devices, such as are found in RAID-1 systems, wherein N is an integer. In the illustrative non-limiting embodiment shown in the present figures, N=3. By "mirrored devices" are meant that the two devices of a pair (until such time as failure might occur per the below discussion) store exactly the same data. The individual data storage devices may be hard disk drives or head-disk assemblies (HDAs).

Proceeding to block 22, each device is logically partitioned into preferably one spare region and a data region that is further logically partitioned into data partitions. More specifically, as indicated at block 24, the spare region of each device consumes 1/(2N−1) of the total device capacity. In the exemplary embodiment shown wherein there are six devices 12 arranged in three pairs, the spare region of each device consumes one-fifth (⅕) of its total storage capacity. Also, as indicated at block 26, the remaining non-spare portion of each device 12 is logically partitioned into (2N−2) preferably equally-sized data partitions. In the embodiment shown, each device 12 has been partitioned into four (4) data partitions.

FIG. 3 illustrates the results of the above steps. Taking the device 12 that is labeled "device 0" in FIG. 3 as an example, after block 26 each device 12 includes one storage region 28 (labeled "S" in FIG. 3) that consumes 1/(2N−1) of the capacity of the device 12. Also, each device 12 has (2N−2) data partitions 30.

In FIGS. 3–6, each column of devices represents a pair of devices, with each device in a pair mirroring its mate. Thus, for example, device 0 is the mate of device 1 and vice versa, and this is represented by each data partition 30 in device 0 storing the exact same data (labeled A1, A2, A3, or A4) as its corresponding data partition in the mate device 1. Likewise, devices 2 and 3 are mates and establish a pair, and devices 4 and 5 are mates and establish a pair.

Block 32 in FIG. 2 indicates that in the event of device failure, a DO loop is entered, and the logic proceeds to block 34. At block 34, the contents of the mate of the failed device are copied into the spare regions of the other devices, with the contents of one data partition being copied to one of the spare regions, the contents of the next data partition being copied to another of the spare regions, and so on.

Figure 4:
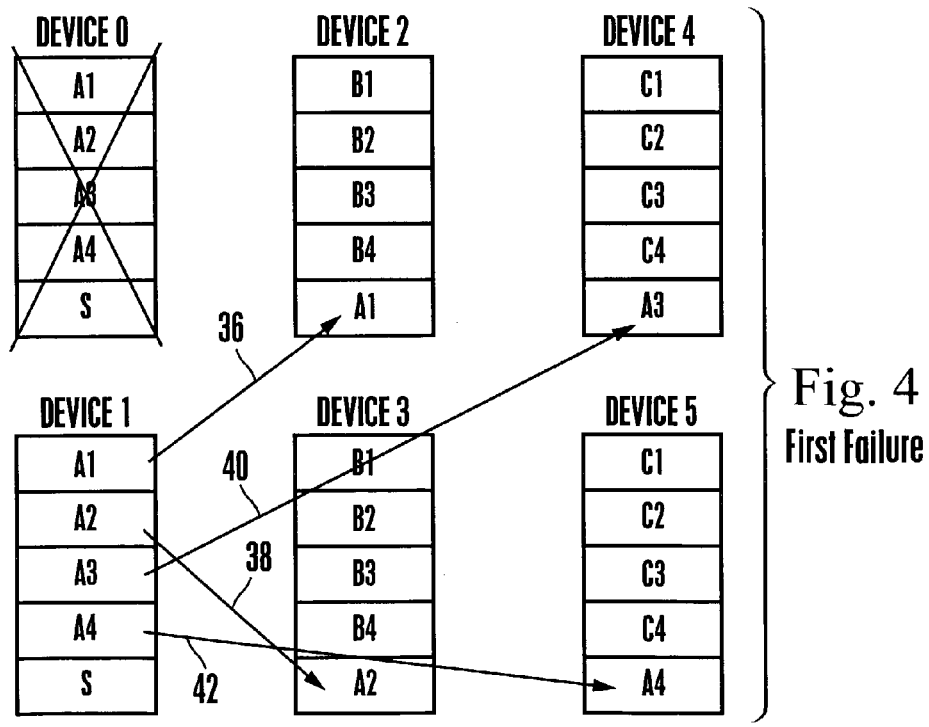
FIG. 4 is a schematic diagram of the storage devices after one device has failed and the contents of its mate have been copied onto the other devices.

FIG. 4 illustrates the process of block 34. Assuming that device 0 has failed, the contents of each partition of its mate (device 1) are copied into respective spare regions of the devices 2-5. Specifically, as indicated by the arrow 36, the contents labeled "A1" of the first data partition of the device I are copied to the spare region of the device 2, labeled "A1" in FIG. 4 to indicate that the copying has been accomplished. Likewise, as indicated by arrow 38 the contents labeled "A2" of the second data partition of the device 1 are copied to the spare region of the device 3, labeled "A2" in FIG. 4 to indicate that the copying has been accomplished. Moreover, arrow 40 indicates that the contents labeled "A3" of the third data partition of the device I are copied to the spare region of the device 4, labeled "A3" in FIG. 4 to indicate that the copying has been accomplished. And, as indicated by arrow 42 the contents labeled "A4" of the fourth data partition of the device 1 are copied to the spare region of the device 5, labeled "A4" in FIG. 4 to indicate that the copying has been accomplished.

Block 44 represents that, owing to the operation at block 34, the system 10 remains fault tolerant for at least one more device failure. More specifically, referring to FIG. 5, if the mate of a failed device fails (in the example shown, if the device 1 fails after device 0 has failed), the data originally stored in the failed pair remains available on the remaining devices. Specifically, as shown by the circles, data A1 remains available in the now-filled spare region of device 2, data A2 remains available in the now-filled spare region of device 3, data A3 remains available in the now-filled spare region of device 4, and data A4 remains available in the now-filled spare region of device 5.

In the event that the second failed device is not paired with the first failed device, FIG. 6 shows that all data nonetheless remains available on the system 10. Specifically, assuming that device 2 has failed after device 0, the mate of device 2, namely, device 3, stores all data originally stored on device 2 (data B1, B2, B3, and B4) as shown by the circles. Also, the data A1 from first-failed device 0 that had been stored after the failure of device 0 in the originally empty spare region of now-failed device 2 remains available on the mate of device 0, namely, on device 1, as shown by the circle.

While the particular SYSTEM AND METHOD FOR SPARING IN RAID-1 SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

I claim:

1. A system including computer usable instructions for causing a digital processing apparatus to undertake method acts in a mirrored storage system having N pair of storage devices, the devices in a pair being mates, the method acts comprising:

allocating 1/(2N−1) of each device as a spare region, in which substantially no data is stored except when a device fails;

partitioning a remaining non-spare region of each disk into (2N−2) data partitions; and in the event of a failed first device, copying data in data partitions of a mate of the failed first device into respective spare regions of remaining non-failed devices.

2. The system of claim 1, wherein the storage devices establish a RAID-1 system.

3. The system of claim 1, wherein the storage devices are arranged on a blade.

4. The system of claim 1, wherein if the mate fails after the first device fails, data stored on the mate remains available on non-failed devices.

5. The system of claim 1, wherein if a second device that is not a mate to the first device fails after the first device fails, some data stored on the second device remains available on a mate of the second device, and remaining data stored on the second device remains available on the mate of the first device.

6. The system of claim 1, wherein the storage devices are hard disk drives.

7. The system of claim 1, wherein the storage devices are HDAs.

8. A data storage system comprising:
plural data storage devices in a RAID-1 configuration;
a spare region being allocated on each device;
data storage regions being allocated on each device;
mean for, in the event of a failed first device, copying data in each data storage region of a mate of the failed device into a respective spare region of remaining non-failed devices, wherein if a second device that is not a mate to the first device fails after the first device fails, some data stored on the second device remains available on a mate of the second device, and remaining data stored on the second device remains available on the mate of the first device.

9. The system of claim 8, wherein the storage devices are arranged on a blade.

10. The system of claim 8, wherein if the mate fails after the first device fails, data scored on the mate remains available on non-failed devices.

11. The system of claim 8, wherein the storage devices are at least one of: hard disk drives, and HDAs.

12. A data storage system comprising:
plural data storage devices in a RAID-1 configuration;
a spare region being allocated on each device;
data storage regions being allocated on each device and further comprising N pair of data storage devices, the spare region of each device representing $1/(2N-1)$ of the total storage capacity of the device.

13. A data storage system comprising:
plural data storage devices in a RAID-1 configuration;
a spare region being allocated on each device;
data storage regions being allocated on each device and further comprising N pair of data storage devices, each device having $(2N-2)$ data storage regions.

14. A method for operating a RAID-1 data storage system having N pair of data storage devices, the data storage devices in a pair being mates of each other, comprising the acts of:
allocating $1/(2N-1)$ of each device as a spare region;
partitioning a remaining non-spare region into $(2N-2)$ data partitions; and
in the event of a failure of a first device, copying data from its mate to devices not paired with the first device.

15. The method of claim 14, comprising, in the event of a failed first device, copying data in each data partition of a mate of the failed first device into a respective spare region of remaining non-failed devices.

16. The method of claim 14, comprising supporting the storage devices on a blade.

17. The system of claim 14, wherein the storage devices are hard disk drives.

* * * * *